INVENTOR
Robert W. Stuart

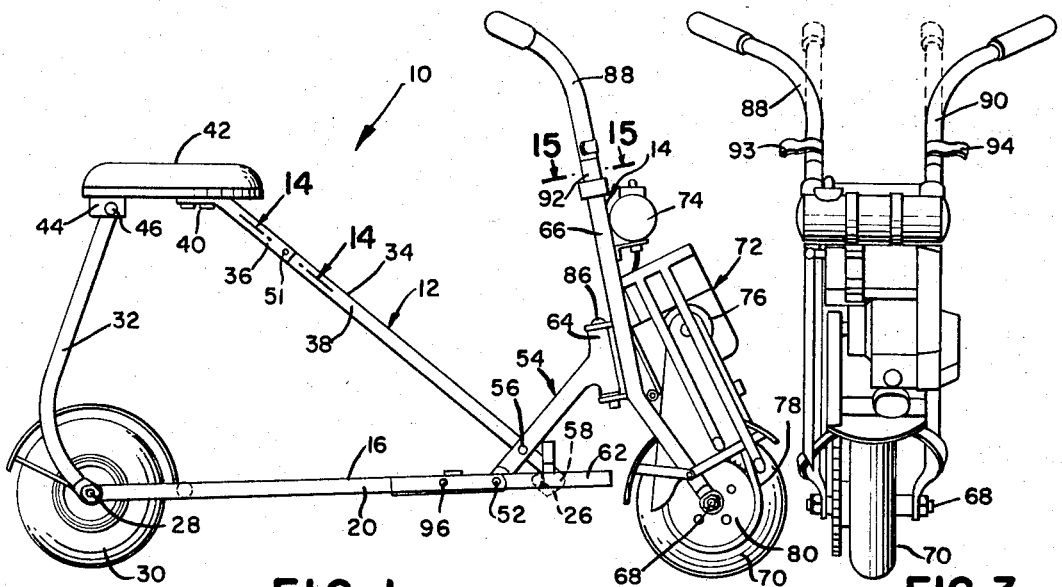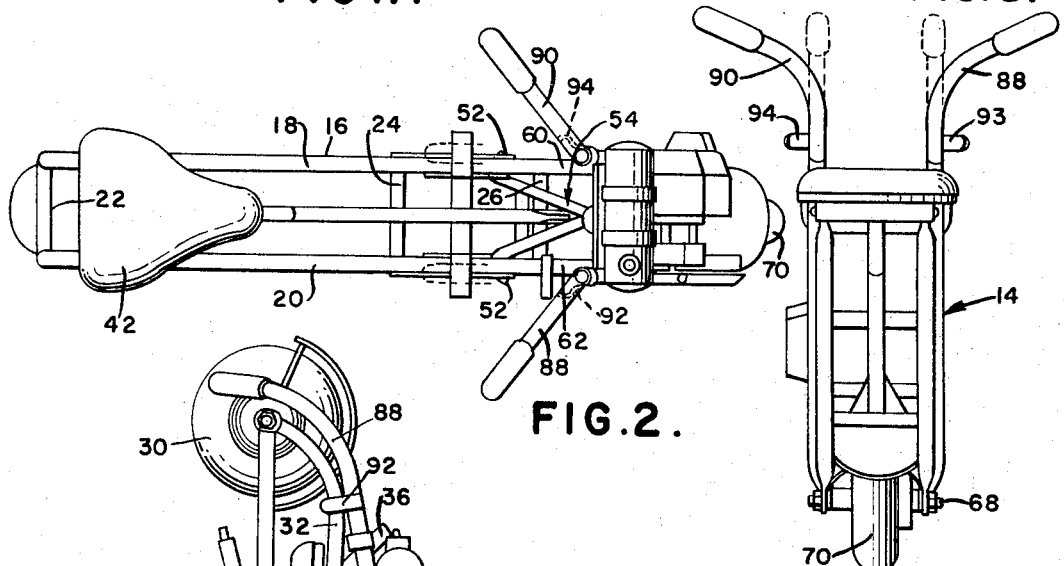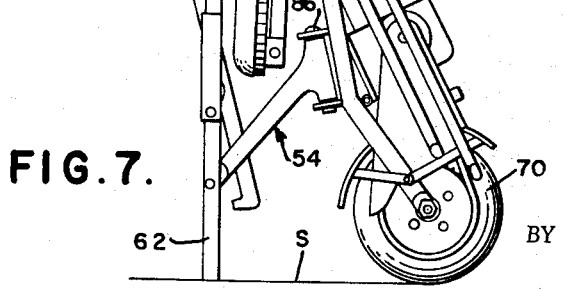

BY *Alvin Browdy*

ATTORNEY

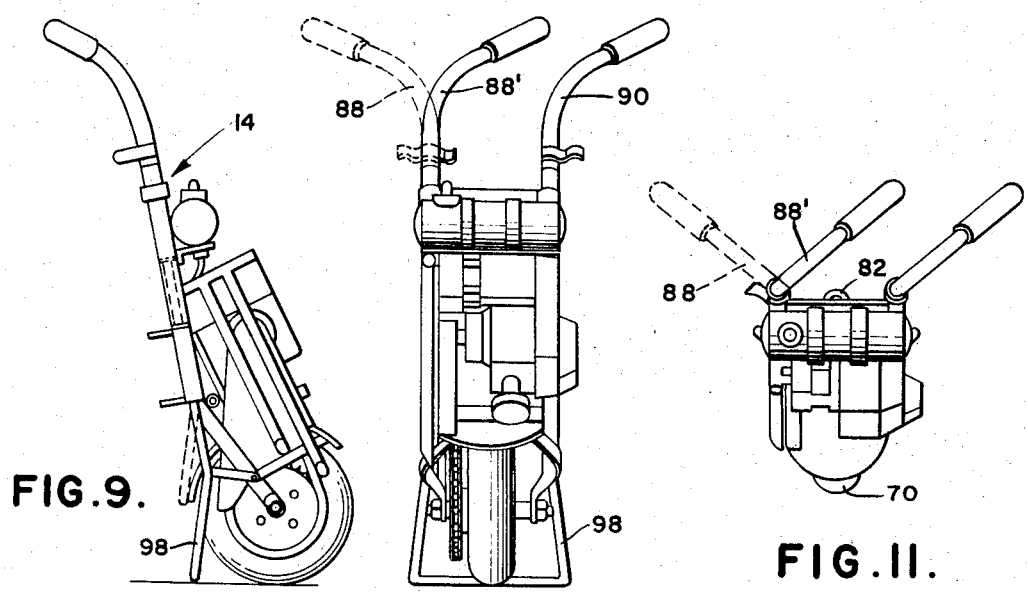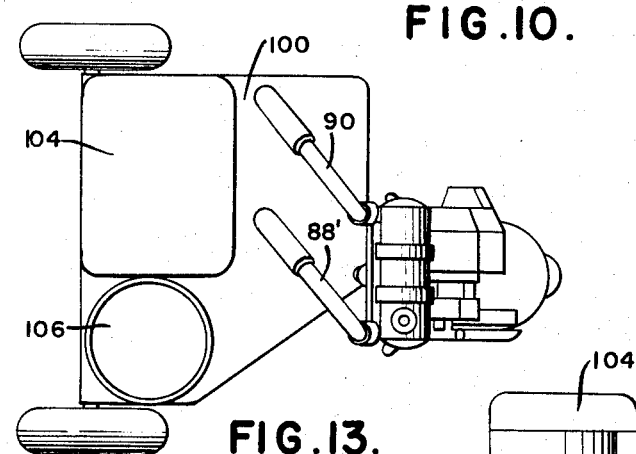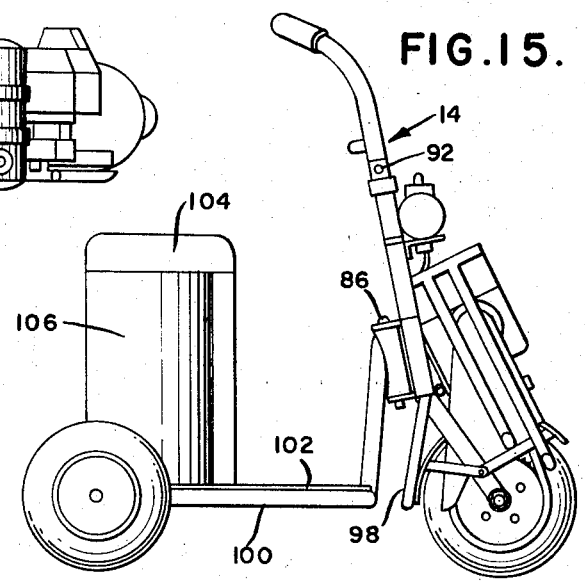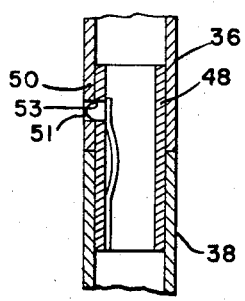

United States Patent Office 3,354,975
Patented Nov. 28, 1967

3,354,975
FOLDABLE VEHICLE
Robert W. Stuart, 955 Caniff Road,
Columbus, Ohio 43221
Filed Feb. 10, 1966, Ser. No. 526,616
9 Claims. (Cl. 180—31)

ABSTRACT OF THE DISCLOSURE

A portable, foldable, vehicle is provided which comprises a chassis and a steering column, the chassis being foldable by means of pivotal connections so that the seat portion of the chassis can pivot to a position in the general plane of the lower chassis portion and the entire chassis portion can be pivoted into the general plane of the lower chassis portion and the entire chassis portion can be pivoted into the general plane of the steering column with latch means for retaining the chassis and the steering column in this folded relationship. Ground engaging supports are provided on the chassis to maintain the folded assembly in position and means are provided for pivotally mounting the handlebars.

---

This invention relates generally to vehicles and, more particularly, to an improved portable vehicle including a foldable frame which permits the vehicle to be readily carried by hand; deposited in the trunk of a passenger car, for example, and which also permits ready erection to present the portable vehicle in a substantially immediate condition for immediate use.

Many vehicles of the "motor scooter" type have been proposed in the prior art; see, for example, the patents to Fritz, 2,503,106; Peters, 2,771,145; Lakata, 2,800,971; May, 3,096,841; Weigel et al., 3,099,326; and Allen et al., 3,155,185. None of these vehicles provide ready manual portability, i.e., the tractor units and chassis units thereof, although being separable, nevertheless are relatively cumbersome and considerable parking difficulties are encountered when they are used. Additionally, when vehicles of the prior art are owned by apartment dwellers, for example, where parking facilities are limited and pilferage is a constant threat, considerable inconvenience and danger of loss to the owner is encountered.

A primary object of the present invention is to provide a novel portable vehicle which includes a foldable frame whereby the vehicle may be readily folded into a manually-portable, compact package requiring a limited amount of storage space and/or permitting the vehicle to be stored, for example, in the trunk of a car.

A further object of the present invention is to provide a novel portable vehicle including a novel foldable frame in which seat and support structure may be readily folded into the general plane of the steering column of the vehicle and maintained thereat.

A further object of the present invention in conformance with that set forth above is to provide on the foldable frame of a portable vehicle a support portion whereby the folded vehicle will stand in a vertically erect position to facilitate manual handling and transport.

And yet another object of the present invention is to provide in a portable vehicle having a foldable frame a novel steering column having a yoke member upon which power means is operatively connected to a lower steering and driving wheel, and in which handle bars are provided with means whereby the handle bars may be disposed in angular relationship to the vertical steering axis of the steering column to permit lateral steering of the tractor unit when used with a golf cart chassis or the like.

These, together with other and more specific objects and advantages of the invention will become apparent from a consideration of the following description when taken in conjunction with the drawings forming a part thereof, wherein:

FIG. 1 is a side elevational view showing the portable vehicle in an erect condition ready for use;

FIG. 2 is a top plan view of FIG. 1;

FIG. 3 is a front elevational view of FIGS. 1 and 2, i.e., looking from right to left at FIGS. 1 and 2; and showing by means of dotted lines the manner in which the handle bars of the steering column are pivoted about vertical pivot portions for maintaining the foldable vehicle frame in a folded-up condition;

FIG. 4 is a rear elevational view of FIGS. 1 and 2, i.e., looking from left to right of FIGS. 1 and 2, and likewise showing by means of dotted lines the manner in which the handle bars are pivoted to retain the vehicle in a folded-up condition;

FIG. 7 is a side elevational view showing the vehicle chassis folded generally into the plane of the steering column and retained thereat, and further illustrating the manner in which the folded-up vehicle is independently supported in a vertical position on a support surface;

FIG. 9 is a side elevational view similar to a portion of FIG. 8 and illustrating the tractor unit per se;

FIG. 10 is a front elevational view of FIG. 9 illustrating the handle bars of the tractor unit in angular relationship with respect to the vertical steering axis of the tractor unit, and showing by dotted lines the manner in which one of the handle bars is re-positioned;

FIG. 11 is a top plan view of FIG. 10;

FIG. 12 is a side elevational view of the tractor unit of FIG. 10 and showing the same attached to a vehicle chassis comprising a golf cart or the like;

FIG. 13 is a top plan view of FIG. 12;

FIG. 14 is an enlarged fragmentary section taken on the plane of line 14—14 of FIG. 1; and FIG. 15 is an enlarged fragmentary section taken on the plane of line 15—15 of FIG. 1.

Figure 5:
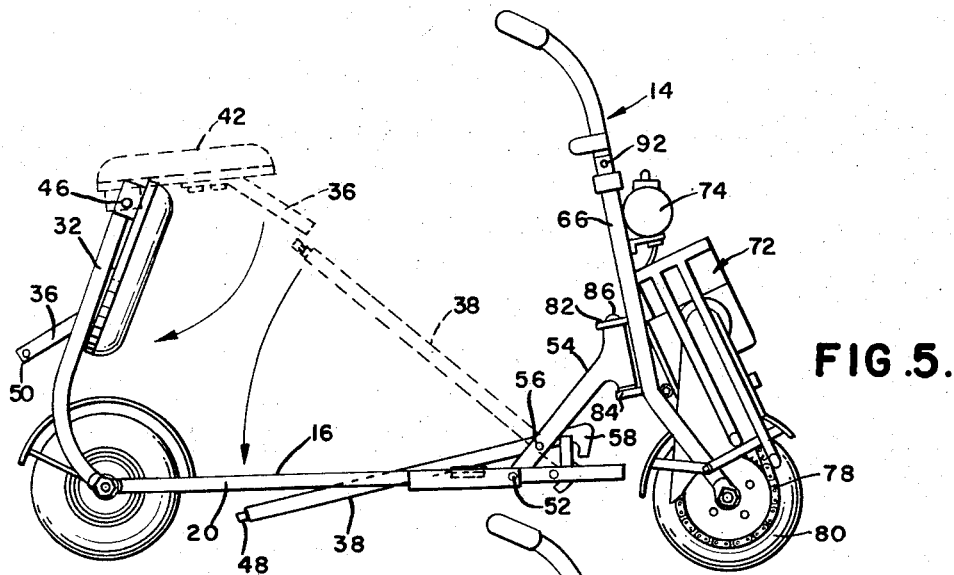
FIG. 5 is a view similar to FIG. 1, showing the vehicle chassis in an intermediate folded condition and showing by means of dotted lines the manner in which the seat portion and one of the brace elements of the chassis are manipulated to facilitate folding of the vehicle.

Considering the drawings in detail and first considering FIGS. 1–4, a portable vehicle is indicated generally at 10 and comprises a chassis indicated generally at 12 and a steering column indicated generally at 14.

The chassis 12, although shown as being constructed of tubular elements, could be constructed from plate elements or the like, staying within the purview and concepts of the foldable frame to subsequently be described in detail. The chassis 12 comprises a lower chassis portion 16 and includes a pair of spaced, generally parallel, frame elements 18 and 20 connected to each other by suitable transverse braces 22, 24 and 26. Journalled between the rear portion of the frame elements 18 and 20 as indicated at 28 is wheel means 30 of any suitable character.

The lower chassis portion 16 has extending vertically therefrom support means comprising a rear, bifurcated brace element 32 pivotally mounted on the lower chassis portion in any suitable manner, for example, on the transverse axis of rotation of the wheel means 30. The support means also includes a forward or front brace element 34 which comprises detachable sections 36 and 38.

The section 36 includes an upper bracket portion 40 fixedly secured to the undersurface of a suitable seat portion 42. The seat portion 42 has adjacent the rear portion thereof a depending bracket 44. The bracket 44 includes a transverse pivot portion 46 connected to the upper end portion of the brace element 32 in any suitable manner. The section 38 incorporates in the upper end a reduced diameter portion 48; see FIG. 5, for example, which is telescopically received within the lower end 50 of section 36 (this telescoped arrangement could be reversed as is apparent to those skilled in the art). The telescoped portions of sections 36 and 38 incorporate therein suitable detachable lock means such as a spring-urged detent 51 mounted on the reduced diameter portion 48 and received within a cooperating aperture 53 in secton 36, see FIG. 14.

The lower chassis portion 16 is pivotally connected on a transverse pivot portion 52 to the lower end of coupling means indicated generally at 54. The coupling means 54 (see FIG. 2) includes a pair of legs respectively pivotally connected to the frame elements 18 and 20. The coupling means 54 includes a transverse pivot portion 56 at which a lower intermediate portion of section 38 of the forward brace element 34 is pivotally mounted, and the section 38 projects below the pivot portion 56 and terminates in an enlarged L-shaped abutment portion 58 which will abuttingly engage brace element 26 when the frame is erected in the position shown in FIG. 1.

The lower chassis portion 16, i.e., the frame elements 18 and 20, include forwardly projecting portions 60 and 62, respectively, which project forwardly beneath the coupling means 54 and provide a ground engaging support when the vehicle is folded to the manually-portable condition shown in FIG. 7.

The coupling means 54 includes an upper, substantially vertical socket or sleeve portion 64, defining the vertical steering axis for the steering column 14.

The steering column 14 comprises a yoke member 66, is bifurcated and has journalled at its lower end, on a suitable axle element 68, wheel means 70. Suitably mounted on the yoke member 66 is suitable power means indicated generally at 72, and comprising in this exemplary embodiment an internal combustion engine of any suitable character, operatively connected to a fuel supply tank 74. The power means 72 includes a power output sprocket 76 having entrained thereover a drive chain 78 engaged with a sprocket 80 integral with the wheel means 70; see, for example, FIGS. 1 and 2.

Although the drive means between the power means 72 and the wheel means 70 is not shown in detail, speed responsive clutches and the like (not shown) may be incorporated as is known in the art. Additionally, controls for the power means 72 and/or suitable brakes (not shown) may be incorporated on the upper end of the steering column as is conventional in motor scooters of the general character involved.

The yoke member 66 has suitably mounted thereon rearwardly projecting, vertical spaced bracket elements 82 and 84 accommodating the sleeve 64 therebetween and receiving therein coupling pin 86 defining the vertical steering axis of the steering column 14 previously mentioned. The yoke member 66 includes in upper portions thereof handle bars 88 and 90, the lower ends of which are pivotally received in the yoke member and define a vertical pivot axis for these handle bars. As previously mentioned, the handle bars 88 and 90 may include therein conventional fuel and brake controls, and, as shown, include suitable handle grips. Indicated at 92 are suitable lock means comprising, for example, spring-urged detent elements of the character disclosed in FIG. 14, which retain the handle bars in different positions of rotation in the bifurcated portions of the yoke member 66. As seen in FIG. 15, one of the bifurcated portions of the yoke member 66 is indicated at 66' and has extending transversely therethrough in circumferentially spaced relationship aperture portions 92', the spring-urged detent element 92 being mutually displaced within the bore of the yoke element 66' and accordingly permitted to engage in any one of the apertures 92', depending upon the desired position orientation of the handle bars. In this regard, attention is drawn to the dotted line views of the handle bars 88 and 90 in FIGS. 3 and 4, illustrating the manner in which the handle bars may be pivoted toward each other for lockingly engaging opposite portions of the rear brace element 32; see FIG. 7. Attention is also drawn to FIG. 10 illustrating another position of handle bar 88'.

Each of the handle bars 88 and 90 have affixedly secured thereto laterally extending clip elements 93 and 94, respectively, which are terminally curved to conform with the cooperating portions of the brace element 32 and serve to retain the vehicle in the folded condition shown.

*Folding of the vehicle to a portable condition*

The vehicle as shown in FIGS. 1–4 is in a condition whereby a passenger when seated on the seat portion 42 may drive the vehicle in the manner in which any conventional two-wheeled motor scooter is driven. It will be noted that the front traction wheel means 70 has the weight of the power means 72 disposed over its axle, this insuring good traction and power efficiency, When it is desired to fold the vehicle from the condition shown in FIGS. 1–4 to that of FIG. 7, the following procedure will accomplish the same:

The sections 36 and 38 of the front brace element 34 are decoupled or detached as shown by dotted lines in FIG. 5, section 38 is pivoted about the transverse pivot portion 56 between frame elements 18 and 20, and seat portion 42 together with section 36 is pivoted about the pivot portion 46 whereby section 36 projects through and rearwardly of an intermediate portion of the bifurcated brace element 32.

Figure 6:
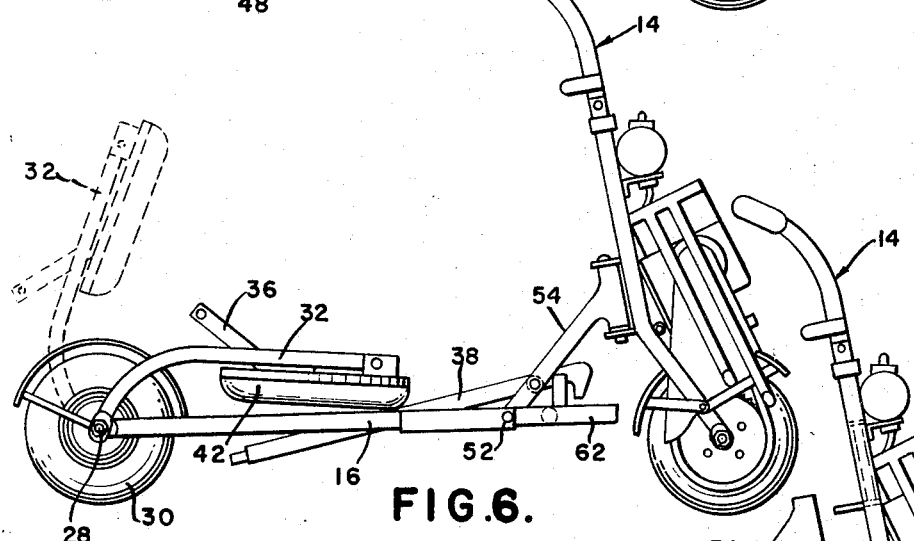
FIG. 6 is a view similar to FIG. 5, showing the next step for folding the vehicle frame and illustrating by means of dotted lines the position from which the seat portion has been folded, i.e., showing the support portions for the seat in the general plane of the lower chassis portion.

Next, the brace element 32 is pivoted about its lower pivot portion, i.e., axle 28 for the wheel means 30, for example, wherein the seat portion overlies section 38, as seen in FIG. 6.

Next, the lower frame portion 16 is pivoted about the pivot portion 52 of the coupling means 54 to a substantially vertical position and the handle bars are pivoted toward each other whereby the clip elements 93 and 94, respectively, engage opposite portions of the rear brace element 32; see FIG. 7, wherein the lock means 92 retain the parts in this position. When the parts are in this attitude, it will be noted that the extension portions 60 and 62 of the frame elements 18 and 20 will engage a support surface S and the now folded-up vehicle will rest on these extension portions 62 and 64 and the front wheeled means 70.

When the vehicle is folded up in the condition shown in FIG. 7, it occupies relatively little space, can be readily lifted manually by a single individual and placed in the trunk of a car, storage closet, etc.

Erection of the vehicle from the folded condition of FIG. 7 is readily accomplished. Initially the handle bars 88 and 90 are unlocked and pivoted away from each other, the chassis is pivoted back to the condition shown in FIG. 6, wherein the rear wheel means 30 engage in a support surface, the rear brace element 32 and the seat portion 42 are pivoted to the dotted line position shown in FIG. 6, whereafter the seat portion 42 is pivoted to the dotted line position shown in FIG. 5 disposing the section 36 at the front brace element 34 in a readily accessible position to be recoupled to the section 38 of the forward brace element. The parts will then be once more in the position shown in FIG. 1 and it will be noted that the lower abutment portion 58 will bracingly engage the transverse brace element 26 of the lower chassis portion 16.

Figure 8:
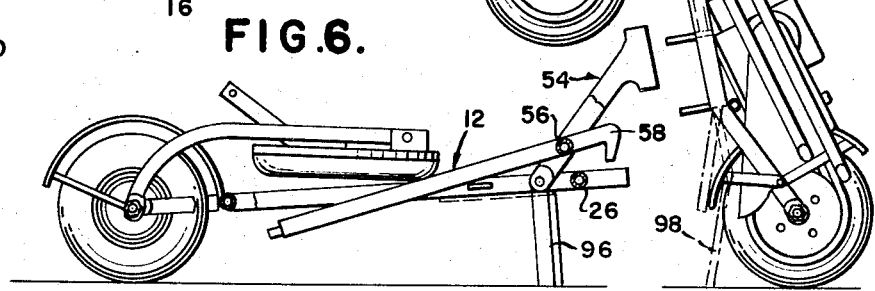
FIG. 8 is a view similar to FIG. 6 showing the chassis separated from the tractor unit and indicating the manner in which the chassis and steering column are independently supported on a support surface when separated from each other.

The steering column 14, i.e., with the motor means 72, fuel tank 74 and lower wheel means 80 may be readily decoupled by removal of the coupling pin 86; see FIG. 8. When the chassis 12 is separated from the steering column 14, a suitable support stand 96 may be oriented or pivoted downwardly as shown in FIG. 8 to support the chassis 12 independently of the steering column 14. When the steering column 14 of the portions thereof are separated from the chassis 12, this unit conventionally comprises a tractor unit and thus the "steering column" and "tractor unit" are considered synonymous in the present application.

The steering column or tractor unit 14 includes a suitable displaceable support stand 98; see FIGS. 8–10, which permits the tractor unit to be supported independently.

The tractor unit of the steering column 14 is adjustable for lateral steering, i.e., for use in a golf cart. In this regard, it will be noted that the handle bar 88 may be pivoted to the position shown at 88′ in FIG. 10 where the handle bars 88′ and 90 are in substantially parallel relationship and extend angularly from the vertical pivot axis of the bracket elements forming the vertical pivot axis of the tractor unit.

When the handle bars are disposed in the positions shown in FIGS. 10 and 11, a vehicular chassis 100 of the two-wheeled type may be readily coupled by means of the pin 86 to the tractor unit; see FIG. 12. The vehicular chassis 100 comprises a support platform 102, a seat portion 104 and a golf club receiving compartment 106. As seen in FIG. 13, the handle bars 88′ and 90 are disposed in a readily accessible position to the driver on the seat 104.

It will be obvious to those skilled in the art that various changes may be made without departing from the spirit of the invention and therefore the invention is not limited to what is shown in the drawings and described in the specification, but only as indicated in the appended claims.

What is claimed is:

1. In a portable foldable vehicle, in combination, a chassis and a steering column, said chassis comprising a lower chassis portion, support means pivotally mounted on said lower chassis portion and including an upper seat portion, said support means including brace means detachably connected between said seat portion and said lower chassis portion for permitting said seat portion and support means to be disposed in the general plane of said lower chassis portion, coupling means between said lower chassis portion and said steering column and including a substantially vertical pivot portion for providing a steering-axis portion therebetween, said coupling means including a pivotal connection with said lower chassis portion for permitting said chassis to be disposed in the general plane of said steering column, and latch means detachably connecting said steering column and said chassis for retaining said chassis and steering column in folded relationship.

2. The structure claimed in claim 1 in which said lower chassis portion includes an extension thereon projecting towards said steering column and beneath said coupling means for providing a ground-engaging support to maintain said chassis and steering column in a vertically disposed position when the vehicle is folded.

3. The structure as claimed in claim 1 in which said brace means includes a rear brace element pivotally connected at opposite ends on a transverse pivot portion beneath said seat portion and a rear portion of said lower chassis portion, a forward brace element pivotally connected at a lower end portion to said coupling means on a transverse pivot portion, and an upper portion pivotally connected to a portion of said seat portion, said second brace element including a detachable connection portion, said second brace element including a lower terminal abutment portion below said transverse pivot portion on said coupling means, said lower chassis portion including an abutment element engageable with said terminal abutment portion on said second brace element when said vehicle is unfolded.

4. The structure as claimed in claim 1 in which said steering column includes a yoke member including two handle bars pivotally mounted thereon on vertical pivot portions, lock means between said handle bars and said yoke member for retaining said handle bars in an operative position, said latch means being mounted on said handle bars.

5. The structure as claimed in claim 4 in which said latch means comprises clip elements extending laterally from the handle bars for detachable engagement with opposed portions of said chassis when the vehicle is folded.

6. The structure as claimed in claim 1 in which said steering column comprises a yoke member having wheel means journalled thereon, power means mounted on said yoke member over the axis of rotation of said wheel means, and force transmitting means connected between said wheel and power means.

7. The stucture as claimed in claim 6 in which said coupling means comprises a detachable coupling assembly including cooperating portions on said lower chassis portion and said yoke member, said steering column comprising a tractor unit for connection to different chassis.

8. The structure as claimed in claim 7 in which said steering column includes a support displaceably mounted on a lower portion thereof for independently supporting the tractor unit in a vertical position on said wheel means.

9. The structure as claimed in claim 1 in which said yoke member includes upper handle bars pivotally mounted thereon on vertical pivot portions, lock means between said handle bars and said yoke member for permitting said handle bars to be located in an operative, generally parallel position in angular relation with respect to the steering axis of said coupling means whereby a lateral steering position is provided to a driver when a golf cart or the like is drawn by said tractor unit.

References Cited

UNITED STATES PATENTS

| 3,079,172 | 2/1963 | Burwell | 280—278 |
| 3,295,863 | 1/1967 | Jaulmes | 280—278 |

FOREIGN PATENTS

| 1,084,159 | 6/1960 | Germany. |
| 495,992 | 10/1954 | Italy. |

KENNETH H. BETTS, *Primary Examiner.*